United States Patent [19]

Dulin

[11] Patent Number: 5,294,001
[45] Date of Patent: Mar. 15, 1994

[54] APPARATUS FOR REMOVING OIL FROM OIL COVERED PARTS

[75] Inventor: Harvey S. Dulin, Chicago, Ill.

[73] Assignee: Dulin Metals Co., Elk Grove Village, Ill.

[21] Appl. No.: 783,365

[22] Filed: Oct. 28, 1991

[51] Int. Cl.$^5$ ............................................. B03B 1/00
[52] U.S. Cl. ........................................ 209/3; 209/245;
    209/254; 209/315; 134/7; 134/40; 15/3.11
[58] Field of Search ............... 209/3, 235, 243, 244,
    209/245, 247, 254, 312, 314, 315, 318, 908, 911;
    134/7, 40, 42; 15/3, 3.11; 366/220, 233

[56] References Cited

U.S. PATENT DOCUMENTS

| | | | |
|---|---|---|---|
| 458,571 | 9/1891 | Gedge | 134/7 X |
| 631,133 | 8/1899 | Starke | 134/7 X |
| 774,826 | 11/1904 | Butler | 134/7 X |
| 1,750,498 | 3/1930 | Truax | 134/7 X |
| 1,824,105 | 9/1931 | Truax | 134/7 X |
| 2,154,883 | 4/1939 | Zahn | 51/163.1 X |
| 2,462,982 | 3/1949 | MacClean et al. | 134/7 |
| 4,002,488 | 1/1977 | Campanelli | 134/7 |
| 4,016,978 | 4/1977 | Danna, Jr. | 209/245 X |
| 4,097,306 | 6/1978 | Carman | 134/40 X |
| 4,599,117 | 7/1986 | Luxemburg | 134/40 X |
| 4,699,713 | 10/1987 | Tieben | 209/315 |

FOREIGN PATENT DOCUMENTS 0173934  3/1986  European Pat. Off. ............... 209/3

Primary Examiner—D. Glenn Dayoan
Assistant Examiner—Tuan N. Nguyen
Attorney, Agent, or Firm—Fitch, Even, Tabin & Flannery

[57] ABSTRACT

Apparatus and method for cleaning the oil off of oil covered parts by the employment of oil absorbing particulate such as ground corncob. The oil covered parts and oil absorbing particulate are mixed together in a tumbler for a period sufficient to bring each of the parts into contact with the oil absorbing particulate. Much of the particulate adheres to the oil covered parts. Thus, following mixing, the particulate adhered parts are subjected to a series of vibrating, impinging, tumbling, and air blowing actions which remove the adhering particulate from the parts and direct the oil absorbed particulate and cleaned parts into two separate, respective vessels.

10 Claims, 3 Drawing Sheets

APPARATUS FOR REMOVING OIL FROM OIL COVERED PARTS

FIELD OF THE INVENTION

This invention relates to an apparatus and method for removing residual oil from parts and, more particularly, relates to such apparatus and method employing comminuted corncobs to facilitate removal of oil from scrap metal.

BACKGROUND OF THE INVENTION

A variety of processes have been employed to remove residual oil from metal parts so that the cleaned parts can later be reused in a mill. One such process includes exposing the oil covered metal parts to high heat, such as by placing the parts in a furnace, to burn off the residual oil. This process for removing the oil has been found to be undesirable in that hydrocarbons are emitted into the air during burning, causing environmental concerns.

It is also known in the prior art to submerse the oil coated parts into a solvent suitable for dissolving the oil. However, this process has been found to present environmental concerns as well in that the used oil-contaminated solvent must be disposed of.

To overcome these environmental concerns, comminuted or ground corncob has been employed. Comminuted corncob material has been found to have good oil absorbing capability. Thus, comminuted corncob material is mixed in with oil-coated parts to bring the corncob material into contact with the oil whereby the oil is absorbed into the corncob material. A significant amount of the comminuted corncob material adheres to the oil-coated parts during mixing and continues to adhere to the parts following the completion of mixing. Mills require that scrap metal be clean, without residual oil or other material thereon. Thus, while comminuted corncob has been found to adequately remove the residual oil in an environmentally safe manner by mixing the comminuted corncob material with the oil-coated metal, it has been found difficult to completely remove the comminuted corncob material from the metal following mixing. It is an object of the invention to provide an apparatus and method for utilizing comminuted corncob to remove oil from scrap metal and removing substantially all adhering corncob particulate from the scrap metal.

Furthermore, currently the comminuted corncob is mixed with oil-coated parts in a batch-type operation. It is another object of the invention to provide an apparatus and method for continuous processing of oil covered parts.

SUMMARY OF THE INVENTION

In accordance with the present invention, oil covered metal parts are first tumbled in a tumbler together with comminuted corncob particulate for a period sufficient to bring substantially all residual oil in contact with the corncob particulate. Thereafter, the tumbler is unloaded, with the corncob-adhered metal and excess non-adhering corncob particulate dumped onto a ocillating screened table which separates an initial portion of the adhering particulate from the metal by vibrating the metal to shake off some of the adhering particulate. The initially separated particulate passes through the screen and is discharged via a chute near the end of the table. The metal parts and remaining particulate move along the oscillating screened table until falling off the end of the table onto an impacting surface, which may be, for instance, a metal plate. The parts bounce off the metal plate onto a vibrating screen. The impact of the particulate-adhered parts against the metal plate serves to dislodge a significant portion of the particulate from the parts, and also to loosen up some particulate. The parts are then carried along upon a vibrating screen which separates the remaining loose particulate from the metal parts, allowing particulate to pass through the screen while preventing the parts from passing through the screen, with the vibration of the screen facilitating still further dislodging of particulate from the parts. An air blower is situated above the screen which imparts a stream of forced air against the parts to blow any remaining particulate off the parts. The parts move along upon the vibrating screen with all the separated particulate falling through the screen until clean, finished parts remain. The separated parts and the particulate are then conveyed separately to collection containers.

DETAILED DESCRIPTION OF THE PREFERRED EMBODIMENTS

An apparatus for removing oil from oil covered parts is illustrated in FIGS. 1-4 and referred to generally at 10. The apparatus of the present invention is particularly well suited for removing oil from scrap metal parts which remains on the parts following processing operations such as punching.

To remove the oil from the parts, so that the parts can be reused, the parts are first placed in a tumbler 12 and tumbled together with oil absorbing particulate. The oil absorbing particulate should have good oil absorbing capacity, be inexpensive, easily obtainable, and readily disposable. Ground corncob has been found to possess these characteristics and is well suited for carrying out the invention. After the parts and oil absorbing particulate have been tumbled together for a sufficient period to bring each of the parts into contact with the particulate, the parts will have particulate adhering thereto, and there will be excess, non-adhering particulate remaining also.

Figure 1:
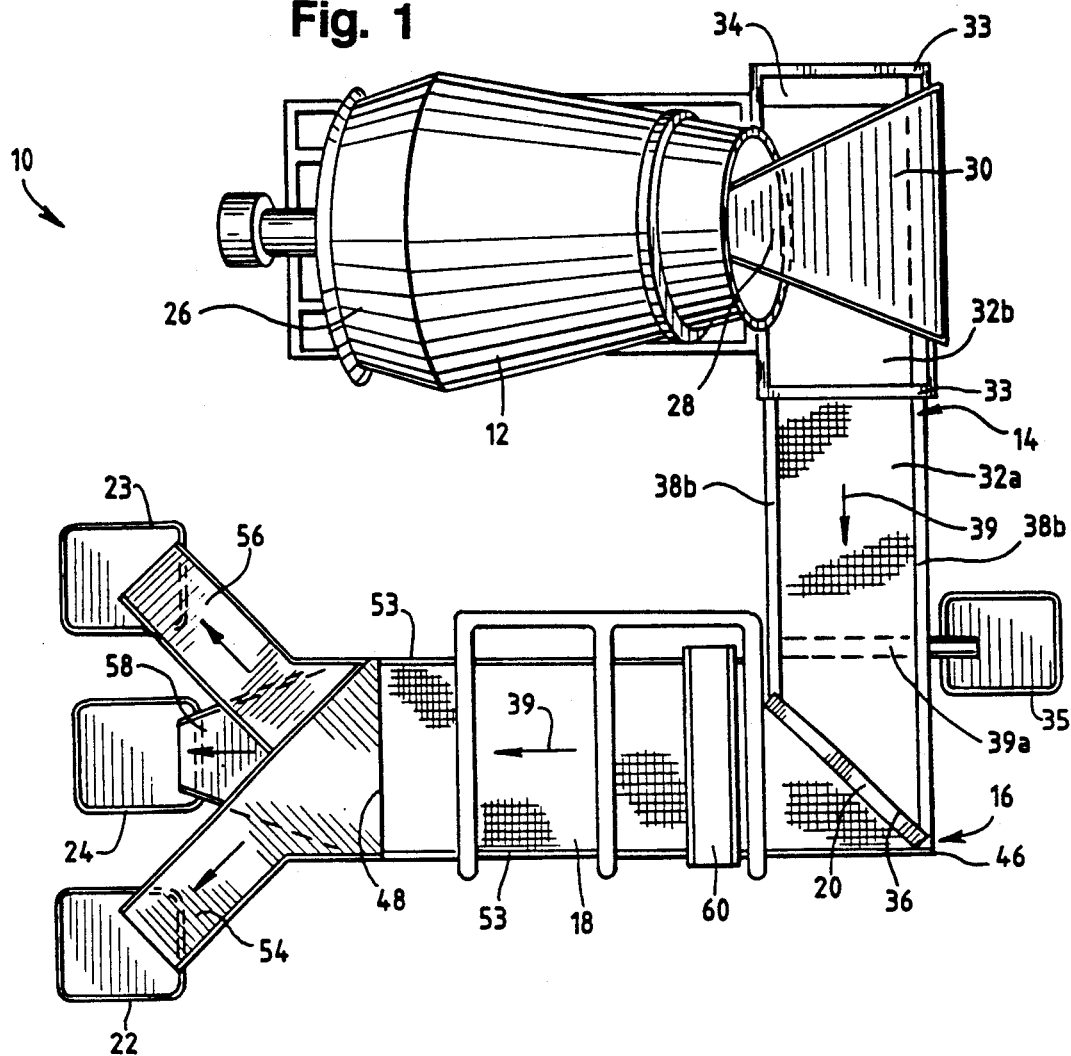
FIG. 1 is a plan view of an apparatus for removing oil from oil covered parts embodying various features of the present invention.
Figure 4:
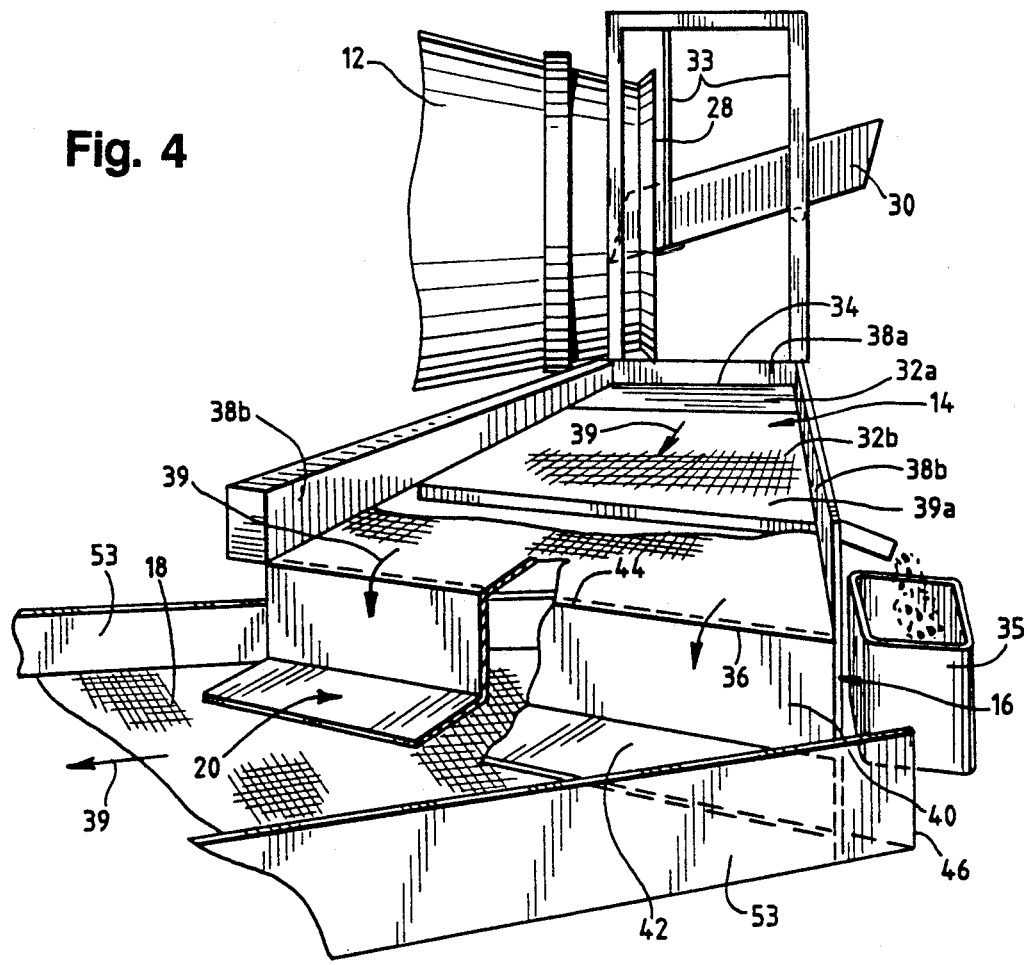
FIG. 4 is an enlarged, perspective view of the drop-off section of the apparatus of FIG. 1.

The parts and particulate are then dispensed from the tumbler 12 onto a vibrating screened table 14 which oscillates rapidly to vibrate the particulate adhering parts, spreading them generally evenly across the surface of the screen 32a portion of the vibrating screened table 14. A first, initial portion of the oil absorbed particulate adhering to the parts is thereby shaken off the parts, passes through the screen 32a, and is channeled by the chute 39a situated directly below the screen 32a to the first collecting vessel 35. The oscillating screened table 14 preferably includes a solid plate portion 32b at the tumbler end 34 thereof. This provides a solid surface onto which the parts from the tumbler fall, so as to reduce wear on the screened portion 32a. As best seen in FIGS. 1 and 4, the oscillating screened table 14 carries the parts from the tumbler end 34, over plate 32b and screen 32a, to the terminal end 36 where there is located a drop-off, indicated generally at 16, at which the parts drop onto a vibrating screen, indicated generally at 18. While falling from the oscillating screened table 14 onto the vibrating screen 18, the parts impinge against a metal bracket 20, with the impact of the parts against the bracket 20 dislodging and loosening a further portion of the oil absorbed particulate which was not shaken off the parts on the oscillating screened table 14.

The parts fall onto a drop-off end 46 of the vibrating screen 18. After falling onto the vibrating screen 18, the parts thereafter move along on the vibrating screen 18, due to its downward inclination from the drop-off end 46 to its terminal end 48, which movement further separates oil absorbed particulate from the parts by allowing particulate to pass through the screen 18 onto the tray 21 situated beneath the screen 18, while preventing the parts from passing through the screen 18. Thus, by the time the parts have reached the distal end of the screen 18, the particulate which adhered to the parts and absorbed substantially all the oil from the parts, has been separated from the parts. The clean parts are then directed into a part collecting vessel 22, and the particulate which falls through the screen 18 onto the tray 21 situated therebeneath is collected in a particulate collecting vessel 24. The clean parts can now be reused and the oil absorbed particulate can be burned for fuel or otherwise disposed of in an environmentally safe manner.

The tumbler 12 in which the parts are mixed with oil absorbing particulate has a spiral interior baffling which maintains parts at the bottom 26 of the tumbler 12 when the tumbler is rotated in a first direction, and urges the parts from the open end 28 of the tumbler 12 when the tumbler is rotated in a second direction. With the tumbler 12 being rotated in the first direction, the oil covered parts and oil absorbing particulate are loaded into the open end 28 of the tumbler via a loading chute 30 which is supported on framework 33 and slanted toward the tumbler 12. Thus, the parts and particulate slide down the loading chute 30 into the tumbler 12. Rotation of the tumbler 12 in the first direction brings the oil covered parts into contact with the particulate, with the spiral interior baffling keeping the parts and particulate near the bottom 26 of the tumbler.

After a predetermined interval sufficient to bring each of the oil covered parts into contact with the oil absorbing particulate, the direction of rotation of the tumbler reversed to the second direction, whereby the interior spiral baffling of the tumbler 12 urges the parts and particulate out of the open end 28 of the tumbler 12. The tumbler 12 remains tilted, with the open end thereof angled upward at an angle of about 15° or so from the horizontal. The parts and particulate are thus dispensed from the tumbler 12 onto the solid plate portion 32b of the oscillating screened table 14. The parts now have oil absorbing particulate adhering to the oil on the surface of the parts and there is excess, non-adhering particulate discharged from the tumbler as well. While the parts and particulate tumble together in the tumbler 12, particulate may adhere to the parts and be knocked off the parts several times prior to discharge from the tumbler 12.

To facilitate conveyance of the parts and particulate from the plate portion 32b at the tumbler end 34 of the table 14 on which they are discharged to the terminal end 36 of the table 14, the oscillating screened table 14 may be angled downward in the transverse direction away from the tumbler 12. That is, the plate 32b at the tumbler end 34 of the oscillating screened table 14 may be situated at a higher elevation than the terminal end 36 of the table. The vibrations of the oscillating screened table 14 urge the parts and particulate situated on the table 14 toward the drop-off 16. Also, to facilitate even distribution of the parts and particulate across the plate 32b, the plate 32b is angled in the lateral direction with the lateral side of the plate 32b situated beneath the tumbler 12 at a higher elevation than the opposite lateral side. Accordingly, the parts and particulate are dumped from the tumbler 12 onto the plate portion 32b of the oscillating screened table 14 in a pile, and are substantially distributed across the plate 32b prior to reaching the screen 32a. The parts achieve a generally uniform distribution across the table 14 by the time the parts and particulate reach the terminal end 36 of the screen 32a. The oscillating screened table 14 includes sidewall 38a at the tumbler end 34 and lateral sides 38b which prevent the parts and particulate from falling off the table 14 prior to reaching the drop-off 16. While the oscillating screened table 14 is the preferred apparatus for conveying and distributing the parts and particulate from the tumbler 12 to the drop-off 16 and onto the vibrating screen 18 due to its low initial purchase cost and low maintenance requirements, it is readily appreciated that other means may be used to convey and distribute the parts and particulate without departing from the inventive concepts of the apparatus.

Upon reaching the drop-off 16, the parts and particulate fall off the terminal end 36 of the oscillating screened table 14, impacting against the bracket 20 prior to landing on the vibrating screen 18. The path of travel of the parts from the oscillating screened table 14, down the drop-off 16 and onto the vibrating screen 18 is shown by arrows 39. The bracket 20 is generally L-shaped having a vertical leg 40 and a horizontal leg 42. The bracket 20 further includes a short lip portion 44 extending from the free end of the vertical leg 40, by which the bracket 20 is attached to the terminal end 36 of the oscillating screened table 14 so that the bracket 20 oscillates with the table 14. Screws, clamps or other suitable means can be used to secure the lip 44 of the bracket 20 to the terminal end 36 of the oscillating screened table 14. The horizontal leg 42 of the bracket 20 is situated above, and spaced slightly from, the vibrating screen 18. The bracket 20 may, alternatively, be mounted independent of the table 14 and may be stationary or else oscillate by independent means.

With reference to FIG. 4, at the drop-off 16, the parts fall off the terminal end 36 of the oscillating screened table 14, strike against the horizontal leg 42 of the bracket 20, and finally fall onto the vibrating screen 18. The drop-off 16 provides an impact of the parts as they fall from the table 14 onto the bracket 20 and also as they fall from the bracket 20 onto the vibrating screen 18. This impact of the parts is desirable in that it causes the particulate adhered to the parts to be knocked off the parts or loosened sufficiently such that subsequent vibrations on the vibrating screen 18 will shake the remaining adhered particulate off of the parts. The extent of the drop-off 16 varies dependent upon the requirements of a particular run. For instance, while a large falling distance is desirable to provide greater impact of the parts against the bracket 20, this interest must be balanced against the fact that a substantial impact of the parts against the bracket 20 may cause undesirable damage to the parts.

In order to minimize plant floor space requirements, the vibrating screen 18 and tumbler 12 are oriented perpendicular to, and on a common side of the oscillating screened table 14 so that the overall layout is C-shaped as seen in FIG. 1. The terminal end 36 of the oscillating screened table 14 is angled, as seen in FIGS. 1 and 4, with the bracket 20 mounted to the angled terminal end 36. Thus, the parts and particulate fall generally uniformly onto the vibrating screen 18 situated beneath the terminal end 36 of the oscillating screened table 14. Alternatively, the apparatus can be laid out in a linear arrangement in which the terminal end 36 of the table 14 is not angled.

After falling off the terminal end 36 of the table 14 and bouncing off the horizontal leg 42 of the bracket 20, the parts and particulate fall onto the vibrating screen 18. The vibrating screen is angled in the lateral direction away from the drop-off 16, with the drop-off end 46 of the screen being at a higher elevation than the terminal end 48 of the screen to cause the parts to move from the drop-off end 46 to the terminal end 48 of the screen 18 under the influence of gravity as the screen 18 vibrates.

The vibration of the screen 18 with the parts and particulate thereon vibrates the parts on top of the screen as the parts migrate from the drop-off end 46 to the terminal end 48 of the screen 18, which serves to further shake particulate adhering to the parts off the parts. The mesh of the screen is coarse enough to allow the particulate which has been separated from the parts to fall through the screen, yet fine enough to prevent the parts themselves from passing therethrough. In this regard, it is important in choosing the proper screen mesh to take into account the fact that the corncob particulate swells up upon absorption of oil. In one apparatus constructed in accordance with the present invention, "#3" ground corncob particulate was run with "#12" mesh screens to produce outstanding results. Finer corncob particulate was found undesirable in that it had a tendency to form clumps.

While a single layer screen can be employed, it is preferable in most instances to employ at least two layers of screens 50 and 52. In the embodiment depicted in FIG. 2, a dual layer vibrating screen 18 is employed with an upper screen 50 having a coarse mesh and a lower screen 52 having a more fine mesh, with the tray 21 spaced from, and situated beneath, the lower screen 52. The coarseness of the screens 50 and 52 are dependent upon the objectives of a particular run. For instance, in runs having two differently sized parts intermixed, it may be desirable to provide a coarse enough meshing in the upper screen 50 to allow the smaller parts to pass through the upper screen 50 but fine enough to prevent the larger parts from passing through the upper screen 50. Thus, the smaller parts are separated from the larger parts, with both sizes of parts moving along on their respective screens and passing into respective part collecting vessels. The lower vibrating screen 52 is then fine enough to prevent the smaller parts from passing therethrough, but coarse enough to let particulate pass therethrough and fall onto the tray 21 situated beneath the lower screen 52. Thus, near the terminal end 48 of the vibrating screen 18, there are large parts remaining on the upper screen 50, smaller parts remaining on the lower screen 52, and particulate which has fallen through the upper screen 50 and lower screen 52 remaining on the tray 21.

In applications wherein scrap metal is to be run which may include metal shavings and/or fragments, the two level screen 18 is desirable to separate out the slivers and fragments from the bulk of the scrap metal, with the upper screen 50 being coarse enough to allow passage of any shavings and fragments, and the lower screen 52 being fine enough to prevent passage of the slivers and fragments but still allowing passage of the particulate. The coarseness of the corncob particulate is important in that too coarse of particulate will not pass through the screens 18 properly. While a wide range of particulates are suitable for carrying out the present invention, ground corncob referred to commercially as "#3 cob" has been found particularly well suited for carrying out the present invention when employed with "#12 mesh" screens.

The optimal coarseness of the single layer vibrating screen 18 will vary dependent upon the particular parts to be run. A relatively coarse upper screen 50 is desirable in that it allows particulate to pass quickly therethrough. This is desirable to separate the particulate as quickly as possible from the parts so that the particulate does not re-adhere to the parts after having been separated therefrom. Also, the oil absorbed particulate may form clusters which are too large to pass through a fine screen mesh and over time the clusters may eventually block the upper screen 50. Contrarily, too coarse of a mesh may result in parts getting caught up in the latticework of the screen or falling through the screen.

Figure 2:
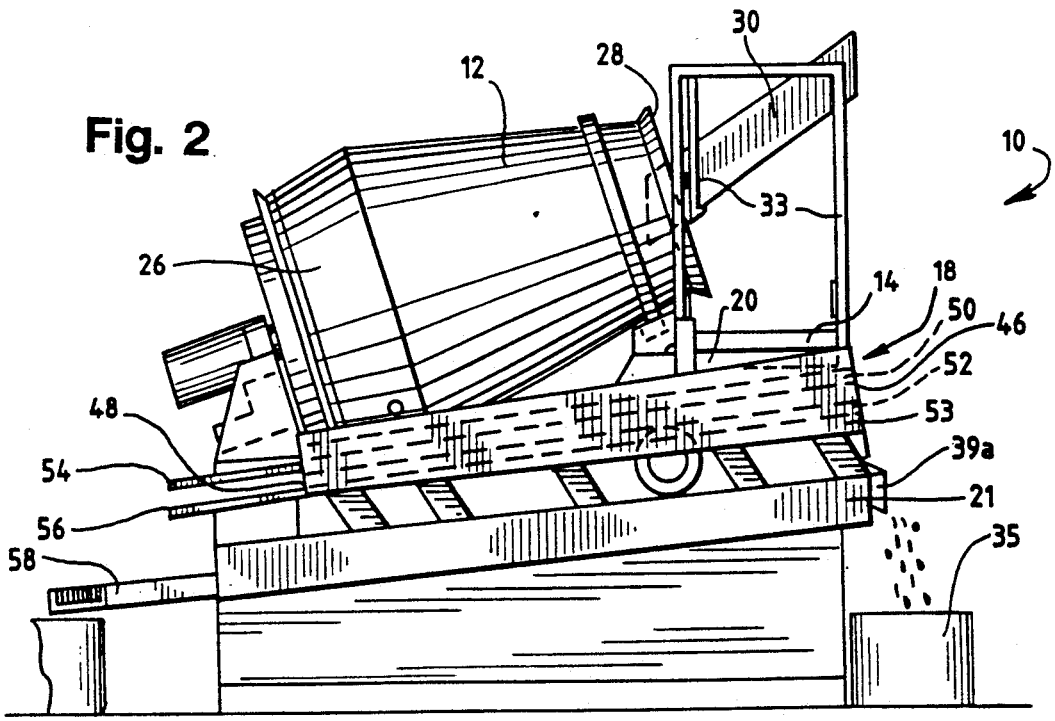
FIG. 2 is a side elevational view of the apparatus of FIG. 1, shown with two planar screens.
Figure 3:
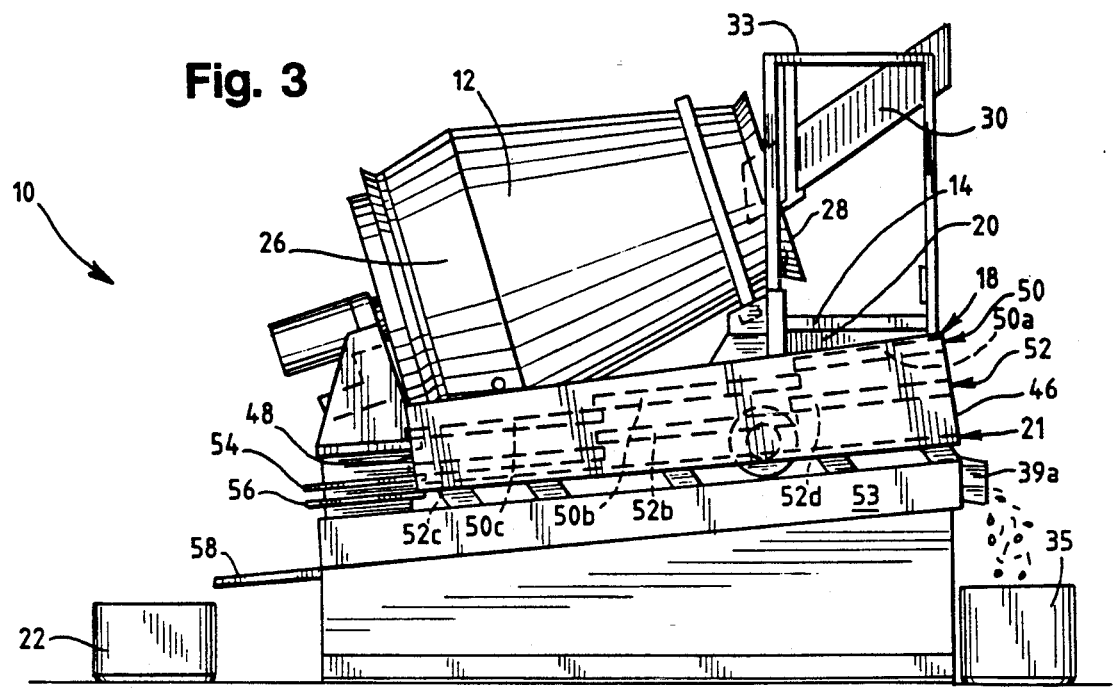
FIG. 3 is a side view of an alternative embodiment of the apparatus, shown with stepped-down screen components.

While planar screens, such as those depicted in FIG. 2, are suitable for carrying out the invention, it is preferable that the screens be non-planar. The vibrating screen 18 is preferably a multi-component screen in addition to being a multi-layered screen. That is, the screen is stepped down from one component of the screen to the next as illustrated in FIG. 3. With continued reference to FIG. 3, a three component screen 18 is illustrated, with each successive screen component 50a, 50b and 50c of the upper screen 50, and each component 52a, 52b and 52c of the lower screen 52 stepped down from the previous screen component to cause the parts to fall from one vibrating screen component onto the next.

The stepped down multi-component screens provide at least two advantages over conventional, planar screens. First, the parts tumble as they fall from one screen component onto the next which brings different surfaces of the parts into contact with the vibrating screen. Since the contact of a part surface against the vibrating screen enhances the removal of adhering particulate, the bringing of different surfaces of the parts into direct contact with the screen, as achieved with the stepped down screen, improves the removal of particulate from the parts. Second, the parts impinge against the screen components as they fall onto each subsequent screen component, with the impact against each of the screen components facilitating separation of adhering particulate from the parts.

The screens 50 and 52 are retained within, and supported by, common sidewalls 53 so that the two screens 50 and 52 vibrate as a single unit together with the sidewalls 53. The tray 21 is preferably also supported and retained within common sidewalls 53 together with the screens 50 and 52 as illustrated in FIG. 3, but may instead be supported separately, spaced beneath the sidewalls 53 as illustrated in FIG. 2.

The upper screen 50 terminates at discharge chute 54, the lower screen terminates at discharge chute 56 and the tray 21 terminates at discharge chute 58, with each of the respective discharge chutes 54, 56 and 58 directing their contents into respective collecting vessels 22, 23 and 24, as illustrated in FIG. 1.

Thus, parts are mixed with oil absorbing particulate such as ground corncobs, dumped from the tumbler 12 onto oscillating screened table 14, on plate 32b, pass over screen 32a, fall off the terminal end 36 of the table 14, impinging against bracket 20 prior to landing on component 50a of the upper screen 50, then fall onto upper screen component 50b, onto upper screen component 50c, slide through upper screen discharge chute 54, and are finally collected in the part collecting vessel 24.

Slivers and fragments of metal which are so small as to pass through the upper screen 50 fall onto the lower screen 52 together with the oil absorbing particulate. Depending upon which upper screen component 50a, 50b or 50c, the slivers and fragments pass through, they will land on one of the lower screen components 52a, 52b or 52c and move from one component of the lower screen 52 to the next, with particulate able to pass through the lower screen 52 but the slivers and fragments remaining on the lower screen 52. After moving from one lower screen component to the next, the slivers and fragments eventually reach the lower screen discharge chute 56, which directs the slivers and fragments into lower screen material collecting vessel 23.

The oil containing particulate which has been separated from the parts, falls through both the upper screen 50 and lower screen 52, being received in the tray 21 situated beneath the lower screen 52. The tray 21 leads into the tray discharge chute 58 which directs the particulate into the particulate collecting vessel 24.

Thus, an apparatus 10 is provided which lends itself to automated operation, producing one part collecting vessel 22 of generally oil-free clean large parts, one collecting vessel 23 of generally oil-free smaller sized parts or fragments, a first particulate collecting vessel 24 of oil soaked particulate and a second particulate collecting vessel 35 of oil soaked particulate, all from a tumbler 12 in which oil covered parts and oil absorbing particulate are dumped together.

Figure 5:
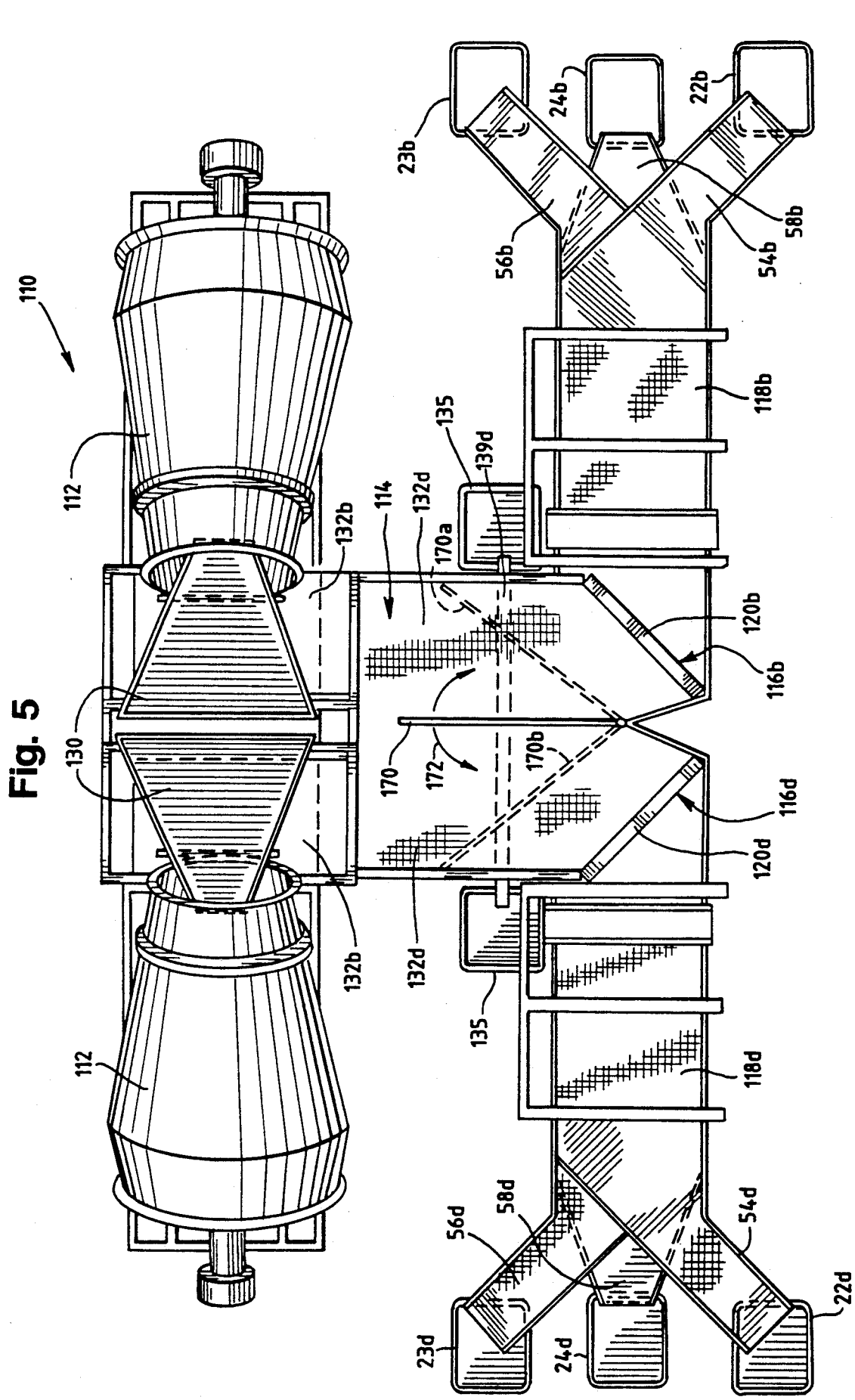
FIG. 5 is a plan view of a further alternative embodiment of an apparatus for removing oil from oil covered parts.

The preferred embodiment of the invention also includes a blower 60 situated above the vibrating screen 18 and immediately following the drop-off 16 which imparts a stream of air against the parts to blow particulate off the parts. The blower is shown in FIGS. 1, 5 and 6 but not included in FIGS. 2 and 3 for clarity in the drawings. The stream of air may also cause the parts to tumble, which further shakes adhering particulate from the parts. The stream of air is preferably directed downward and generally opposite the path of travel of the parts to optimize its effect on the parts.

A limitation in the production rate is the size of the vibrating screen, with the tumbler 12 and oscillating screened table 14 able to deliver more parts and particulate than the vibrating screens can handle adequately. Thus, in instances in which the production rate is of particular importance, it may be desirable to provide two separate vibrating screens 18 leading from a common oscillating screened table 14.

Whereas the apparatus discussed above allows for batch processing, with production time being lost during the interval that each batch of parts and particulate are being mixed in the tumbler 12, an alternative embodiment of the invention, which allows for continuous processing, is illustrated in FIG. 5.

The apparatus 110 of the alternative embodiment is illustrated in FIG. 5 and is essentially the same as that of the preferred embodiment but includes two separate tumblers 112 and two separate paths of travel of the parts and particulate following unloading from the two tumblers. While a first tumbler 112 is mixing parts and particulate, the other tumbler is discharging its contents onto the oscillating screened table 114. Thus, by alternating the two tumblers 112, a continuous supply of parts and particulate are presented, and the rate of production increased significantly.

With continued reference to FIG. 5, it is seen that two tumblers 112 are positioned on opposite sides of the oscillating screened table 114, with each tumbler 112 having a respective loading chute 130 into which oil covered parts and oil absorbing particulate are loaded into the tumblers 112. While one tumbler 112 is mixing the parts with the particulate, the other tumbler is dispensing already mixed parts and particulate onto the oscillating screened table 114. The parts move along the oscillating screened table in the direction of the drop-offs 116a and 116b.

A dividing arm 170 is provided in the oscillating screened table 114 and is situated approximately midway between the lateral sides thereof. The dividing arm 170 serves to separate the mixture of parts and particulate dispensed from the tumbler 112 into two portions. A first portion of the parts and particulate move toward the left drop-off 116a and the second portion of parts and particulate move toward the right drop-off 116b (as viewed in FIG. 5). The parts and particulate thereafter strike against their respective brackets 120a and 120b, vibrate and move along their respective vibrating screens 118a and 118b, and finally slide through their respective discharge chutes 54a, 56a, 58a and 54b, 56b and 58b which direct the parts and particulate into their respective collecting vessels 22a, 23a, 24a and 22b, 23b and 24b as discussed above with respect to the single vibrating screen embodiment.

The dividing arm 170 is pivotal in the direction of arrows 172 to allow all of the parts and particulate to be directed toward one drop-off 116a or the other drop-off 116b. The dividing arm is pivotal between the position indicated in phantom at 170b, in which parts and particulate are all directed toward drop-off 116b, and the position indicated in phantom at 170a, in which the parts and particulate are all directed toward drop-off 116a. This is desirable to allow removal of a full collecting vessel and replacement with an empty collecting vessel without the parts and particulate continuing to fall therein.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. An apparatus for employing oil absorbing particulate to remove residual oil from oil covered parts, the apparatus comprising:

mixing means for mixing said parts and said particulate together to bring said particulate in contact with said oil covered parts, at least a portion of said particulate adhering to said oil covered parts upon contact therewith;

dispensing means for dispensing the particulate adhering parts and any excess particulate from said mixing means;

conveying means extending generally horizontally for receiving the particulate adhered parts and excess particulate dispensed by the dispensing means and conveying the particulate adhered parts and excess particulate from an area adjacent to said mixing means to an area at which the parts and particulate drop off the conveying means;

said conveying means including a vibrating surface to vibrate a portion of the adhering particulate off of the parts;

said vibrating surface being angled longitudinally with the area adjacent the mixing means being at a higher elevation than said area at which the parts and particulate drop off of the conveying means;

impact means situated below said conveying means for receiving and impacting the parts and particulate thereagainst falling from said conveying means to dislodge a portion of the adhering particulate; and vibrating screen means, extending generally horizontally and having a load end and a terminal end, said vibrating screen means being angled downwardly from said load end to said terminal end to transfer parts and any excess particulate from said load end to said terminal end, said load end being positioned beneath said impact means to receive the parts and particulate on the screen means after impacting against said impacting means, said terminal end being spaced sufficiently from the load end such that substantially all adhering particulate is dislodged from the parts by the time the parts reach the terminal end, the vibrating screen means passing particulate therethrough while preventing the parts from passing therethrough to separate the removed and excess particulate from the parts.

2. An apparatus in accordance with claim 1 wherein said conveying means includes a screened portion to allow an initial portion of the particulate to pass therethrough.

3. An apparatus in accordance with claim 1 including a particulate collecting tray situated beneath the screen means to collect the particulate which passes through the screen means.

4. An apparatus in accordance with claim 1 wherein said vibrating screen means includes at least two screens spaced vertically from one another, with an upper screen having a mesh of predetermined coarseness to allow said particulate and small parts to pass therethrough while preventing large parts from passing therethrough, and a lower screen having a finer mesh than the upper screen to allow said particulate to pass therethrough while preventing any of the parts from passing therethrough.

5. An apparatus in accordance with claim 4 wherein the vibrating screen means includes a plurality of screen components stepped down from one another in said downward direction so that the parts and particulate fall off one screen component onto a subsequent screen component as the parts and particulate travel in the downward direction with the impact of the parts against each subsequent screen component dislodging a portion of the particulate from the parts.

6. An apparatus in accordance with claim 1 wherein said impact means includes upper and lower surfaces with said parts falling from said upper surface onto said lower surface.

7. An apparatus in accordance with claim 1 wherein said oil absorbing particulate includes ground corncob.

8. An apparatus in accordance with claim 1 wherein the impact means is supported by the vibrating surface.

9. An apparatus in accordance with claim 1 wherein said vibrating surface is further angled laterally, to distribute the parts and particulate across the vibrating surface.

10. An apparatus in accordance with claim 1 which further includes a blower located above the vibrating screen means to facilitate the dislodging of particulate from the parts.

* * * * *